US008549435B1

(12) United States Patent
Bushore et al.

(10) Patent No.: US 8,549,435 B1
(45) Date of Patent: Oct. 1, 2013

(54) DISPLAYING THUMBNAILS FOR ONE OR MORE FILES TO BE IMPORTED

(75) Inventors: Lance D. Bushore, Seattle, WA (US);
David C. Stephens, Shoreline, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1500 days.

(21) Appl. No.: 11/527,141

(22) Filed: Sep. 25, 2006

(51) Int. Cl.
*G06F 3/048* (2013.01)

(52) U.S. Cl.
USPC ............ 715/838; 715/770; 715/769; 715/835

(58) Field of Classification Search
USPC .................................. 715/838, 835, 769, 770
See application file for complete search history.

(56) References Cited

U.S. PATENT DOCUMENTS

| | | | |
|---|---|---|---|
| 7,609,257 B2* | 10/2009 | Wright et al. | 345/419 |
| 2004/0056981 A1* | 3/2004 | Hamamura et al. | 348/578 |
| 2005/0187943 A1* | 8/2005 | Finke-Anlauff et al. | 707/100 |
| 2005/0210414 A1* | 9/2005 | Angiulo et al. | 715/838 |
| 2005/0223329 A1* | 10/2005 | Schwartz et al. | 715/711 |
| 2006/0085743 A1* | 4/2006 | Baudisch et al. | 715/526 |
| 2007/0050353 A1* | 3/2007 | Ekberg et al. | 707/5 |
| 2007/0128899 A1* | 6/2007 | Mayer | 439/152 |
| 2007/0268313 A1* | 11/2007 | Dolph et al. | 345/635 |

OTHER PUBLICATIONS

David Blatner, InDesignSecrets, Blog Archive, InDesign CS3 Sneak Peek Shows, May 17, 2006, http://indesignsecrets.com/indesign-cs3-sneak-peek.php.
Dave Nagel, Adobe Talks InDesign CS3, http://mediadesigner.digitalmedianet.com/articles/viewarticle.jsp?id=43386.
Prince McLean, Four Adobe InDesign CS3 Features Revealed, May 25, 2006, http://www.appleinsider.com/article.php?id=1773.
MacNN, Adobe InDesign CS3 Sneak Peak, May 25, 2006, http://www.macnn.com/print/34995.
Jeff Gamet, Adobe InDesign CS3 Feature Preview, May 25, 2006, http://www.macobserver.com/article/2006/05/25.6.shtml.
Drawbob, InDesign CS3 Sneak Peak!, May 25, 2006, http://looprumors.com/article.php?indesign-cs3-sneak-peak,3585653793.

* cited by examiner

*Primary Examiner* — Boris Pesin
*Assistant Examiner* — Rinna Yi
(74) *Attorney, Agent, or Firm* — Kilpatrick Townsend & Stockton LLP (57) ABSTRACT

A piece of data is selected from a collection of one or more pieces of data to be inserted. A thumbnail is generated that includes at least some content associated with the selected piece of data. The thumbnail is displayed in place of or with a cursor, where the cursor is associated with specifying an insertion location in a document.

26 Claims, 12 Drawing Sheets

Next piece of data to be placed 600

Add piece of data to collection of data to be placed

Next piece of data to be placed 600

Remove/place piece of data from collection of data to be placed

Next piece of data to be placed 606

Next piece of
data to be
placed

Change ordering

Next piece of
data to be
placed

DISPLAYING THUMBNAILS FOR ONE OR MORE FILES TO BE IMPORTED

BACKGROUND OF THE INVENTION

Importing files is a common task when creating or generating a document, such as printed documents, word processing documents, or web pages. For example, a photographer may take pictures for a catalogue. The photographer may send his digital photographs to a layout specialist who lays out the catalogue. Another person may write the descriptions of the items, including (for example) prices, sizes, product numbers, colors, etc. A layout specialist or other user may import these photographs and/or descriptions into a document where the data is manipulated or operated upon. For example, some of the photographs are cropped or the color of a photograph is adjusted. The format and/or layout of the descriptions may be adjusted (e.g., to fit into an area or region that does not obscure or block the items being sold). Typically, when placing multiple files in a document, the user must choose one file at a time, and then a generic icon is displayed in place of a cursor to indicate that a file is being placed. Alternately, some applications require users to choose a destination on the page before choosing the file to be placed. It would be desirable if more convenient or useful techniques for insertion of files or other data into a document could be developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Displaying a thumbnail is disclosed. A piece of data is selected from a collection of one or more pieces of data to be inserted. In some embodiments, the selected piece of data is first in a queue or ordering associated with the collection. A thumbnail is generated that includes at least some content associated with the selected piece of data. In some embodiments, thumbnails are pre-generated. For example, in some embodiments, a thumbnail is generated for a given piece of data in the collection before that piece of data is selected from a collection. In some embodiments, a thumbnail is pre-generated when a user adds the piece of data to a collection. The thumbnail is displayed in place of or with a cursor, where the cursor is associated with specifying an insertion location in a document. In some embodiments, movement of the thumbnail is coupled to that of the cursor. For example, in some embodiments, the thumbnail and cursor are (or appear to be) a single object that moves together. In some embodiments, only a thumbnail is displayed. In some embodiments, a thumbnail is displayed with a cursor but the thumbnail does not move with the cursor.

Figure 1A:
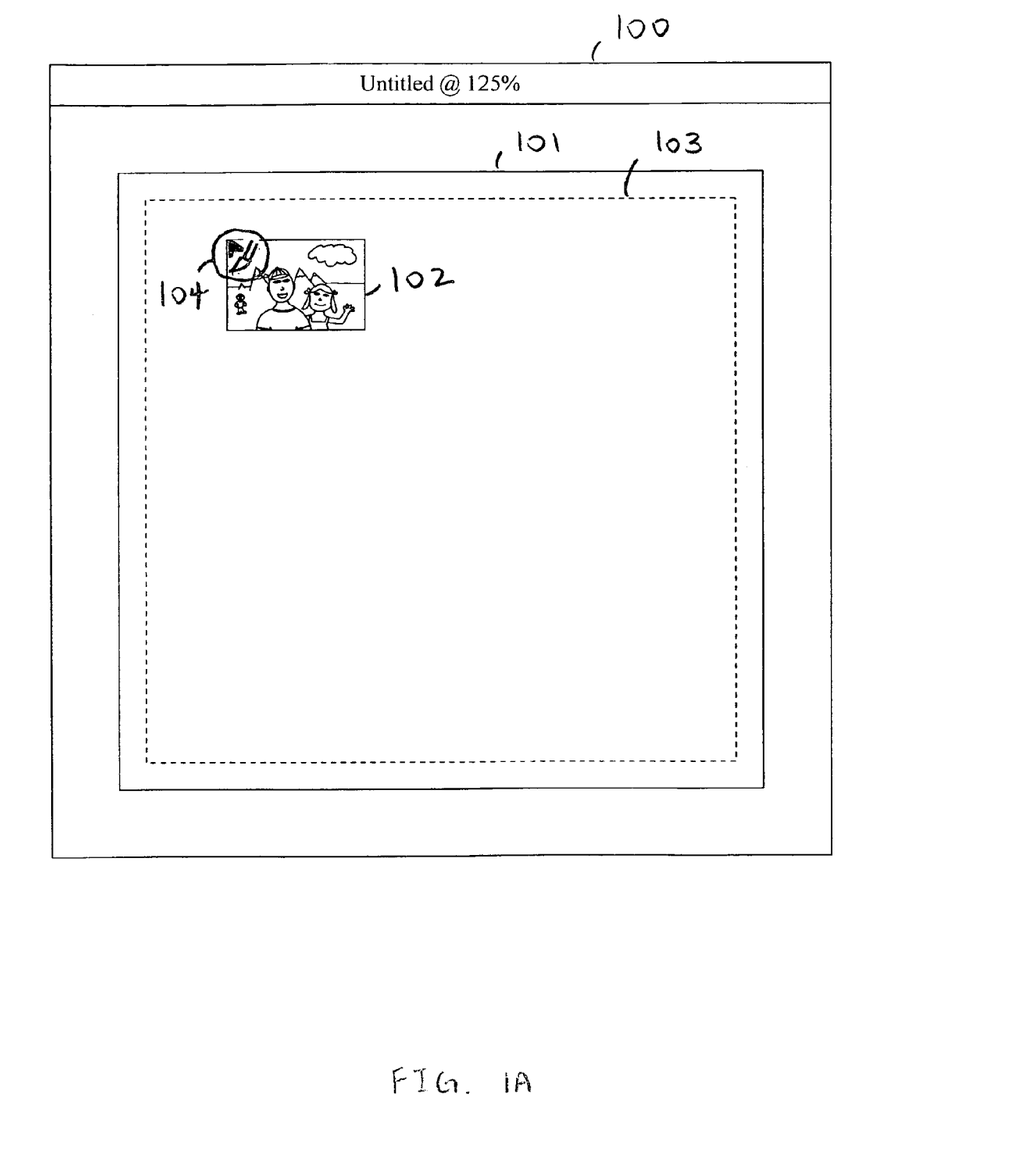
FIG. 1A is a diagram illustrating an embodiment of a thumbnail of an image that is to be placed.

FIG. 1A is a diagram illustrating an embodiment of a thumbnail of an image that is to be placed. In the example shown, a user has selected an image of two people on vacation to be placed or inserted into placement area 103 of page 101. As used herein, the words placed and inserted are used interchangeably. Document window 100 in this example is associated with a software application for viewing, generating, and/or manipulating printed documents, such as Adobe® InDesign®. In this example, all text, images, or other objects/data are located within placement area 103. That is, all placed/imported data as well as data that is created by writing or drawing is located within the boundary of placement area 103; no objects/data are located outside of placement area 103 in this example. In this example, placement area 103 is defined using margins from the edges of page 101. In various embodiments, a placement area is larger than page, a page is part of a document (that in some cases includes other pages), a page includes one or more placement areas in which data or objects are placed, and/or a placement area is larger/smaller. In some embodiments, objects/data are allowed to be placed anywhere in a document or page.

In document window 100, thumbnail 102 is displayed with placement cursor 104. In various embodiments, objects, text, images, documents, files, or other data can be inserted or placed (e.g., into placement area 103) if so desired by a user. In this example, an image is being placed and thumbnail 102 displays a down sampled version of the image to be placed. A thumbnail is generated based on the content of data that is to be placed or inserted, for example rather than using a default or generic icon. Thumbnail 102 and placement cursor 104 are displayed together; movement of one is coupled to movement of the other so that when one moves, the other moves with it. In some embodiments, placement cursor 104 and thumbnail 102 are actually two, separate objects that are rendered or displayed, but they are displayed as always being next to each other so that a user perceives them to be a single or coupled object. For example, as a user moves a mouse, stylus, or other pointing device around, both placement cursor 104 and thumbnail 102 move around within document window 100 together as a single unit.

Placement cursor 104 is associated with specifying a location within placement area 103 to insert or otherwise place the image or other data being inserted. Once the user has placement cursor 104 and/or thumbnail 102 in a desired position, she can trigger or otherwise cause the image to be inserted in the specified location, for example by clicking a mouse button. (Alternatively, she may decide she does not want to insert the image after all, and may cause the image to be removed from a collection of images to be inserted.) The following figure illustrates an example of document window 100 after the image of the two vacationers has been placed.

Figure 1B:
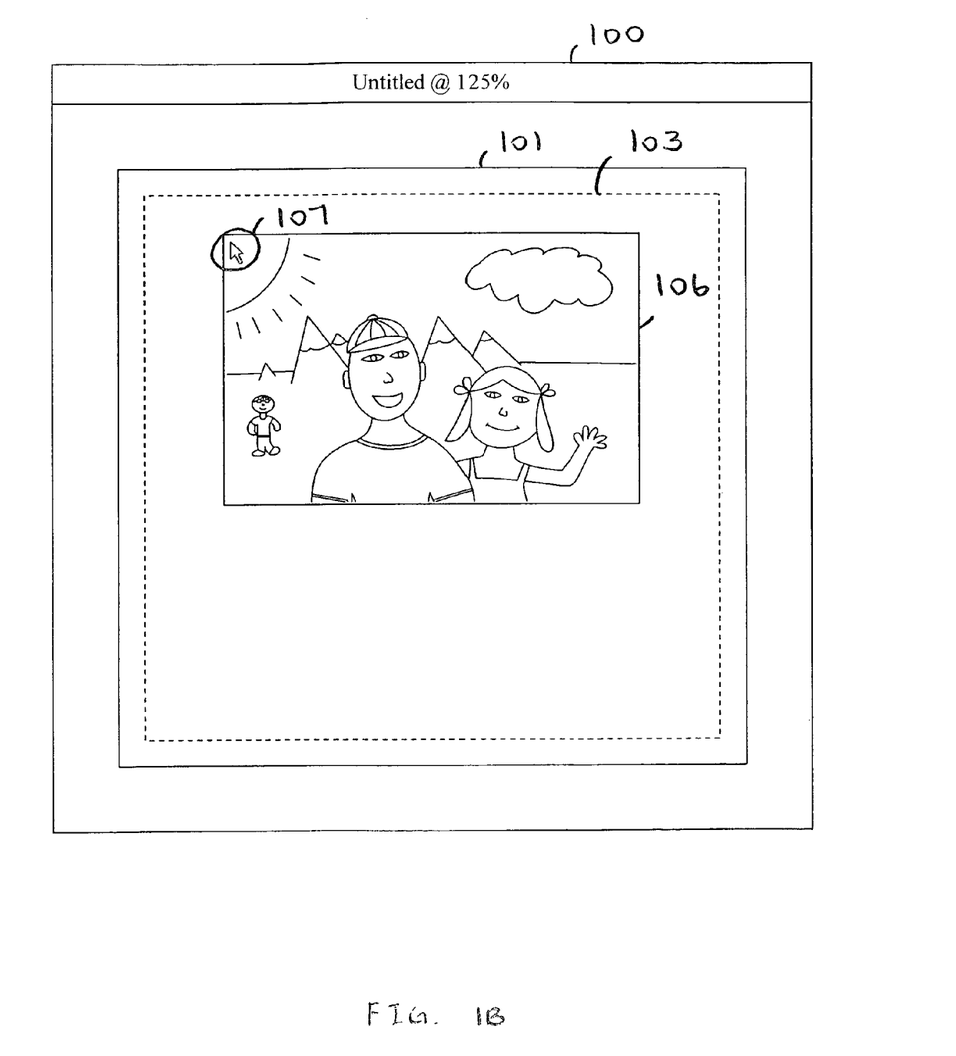
FIG. 1B is a diagram illustrating an embodiment of a document after an image has been inserted.

FIG. 1B is a diagram illustrating an embodiment of a document after an image has been inserted. In the example shown, a point in time after the example of FIG. 1A is shown. After finding a desired location, the user causes the image of the two people on vacation to be placed in placement area 103, resulting in placed image 106. As an example of how placement is triggered or caused, in some embodiments a user clicks on a mouse button or performs a prescribed combination of keystrokes when a placement cursor and/or thumbnail is located above a desired position and data is inserted at the specified location.

Once placed, the thumbnail is no longer displayed and the placement cursor becomes pointer 107. In this example, there is only one piece of data to be placed and after placement a collection of data to be placed is empty. In some embodiments, there is still at least one piece of data to be placed and a new thumbnail is generated and displayed. For example, a user may have two pieces of data to place. A thumbnail is displayed for the first piece of data in a queue or ordering of data to be placed. After the first piece of data is placed or inserted, a new thumbnail is displayed for the remaining piece of data to be placed. As described above, in some embodiments, a thumbnail is displayed for at most one piece of data within a collection of data to be inserted.

Displaying a thumbnail prior to an actual placement or importation of data offers some conveniences in certain scenarios. For example, a user may be interrupted while working and she may have forgotten which piece of data she selected to be inserted, or she may have accidentally selected the wrong image. By displaying a thumbnail of an image or other data to be inserted, she would be able to remember which image she selected and/or be able to detect a mistake made when selecting data.

In some embodiments, a piece of data to be inserted includes text. The following figures illustrate some embodiments for displaying a thumbnail for text.

Figure 1C:
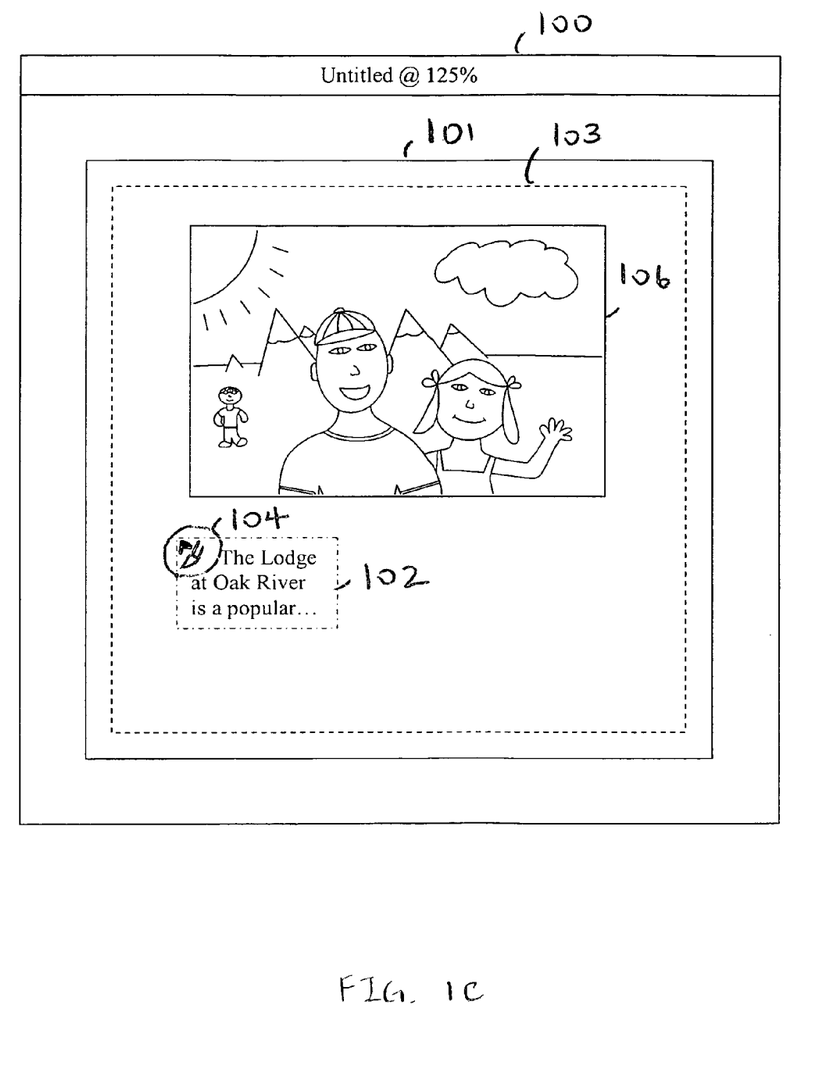
FIG. 1C is a diagram illustrating an embodiment of a thumbnail of text that is to be inserted in a document.

FIG. 1C is a diagram illustrating an embodiment of a thumbnail of text that is to be inserted in a document. In the example shown, a point in time after the example of FIG. 1B is shown. A user has selected text to be inserted into placement area 103 and thumbnail 102 has been updated to reflect the new piece of data to be inserted. Similar to the example of FIG. 1A, movement of thumbnail 102 (which now includes a beginning portion of some text to be inserted) is displayed with placement cursor 104 and/or movement of the two is coupled.

Thumbnail 102 in this example includes some beginning portion of text to be inserted. For example, the text is divided into a beginning and end portion and the beginning portion is included in a thumbnail. In some embodiments, a thumbnail is filled with as much text as can be included until the thumbnail is full.

An insertion location is selected by a user in which to insert or place the text (e.g., by moving a mouse or other input device around, causing placement cursor 104 and thumbnail 102 to move within document window 100) and placement is triggered using a prescribed input (e.g., a combination of keystrokes and/or a clicking a mouse button).

In some embodiments, font type (e.g., Times New Roman), font effects (e.g., bold, underline, or italics), font size (e.g., 12 point), and/or formatting (e.g., indentations, spacing between lines or characters, left/right alignment) are removed when generating a thumbnail. That is, in some embodiments some font and/or formatting styles or settings used to display a thumbnail may not actually be the styles or settings associated with a piece of text to insert. In some embodiments, thumbnails are displayed using a defined format or style. For example, the same font type (e.g., New York) and the same font size (e.g., 10 point) can be used to display thumbnails for different pieces of text to be inserted. Alternatively, in some embodiments, font and/or formatting settings are preserved when generating a thumbnail.

Figure 1D:
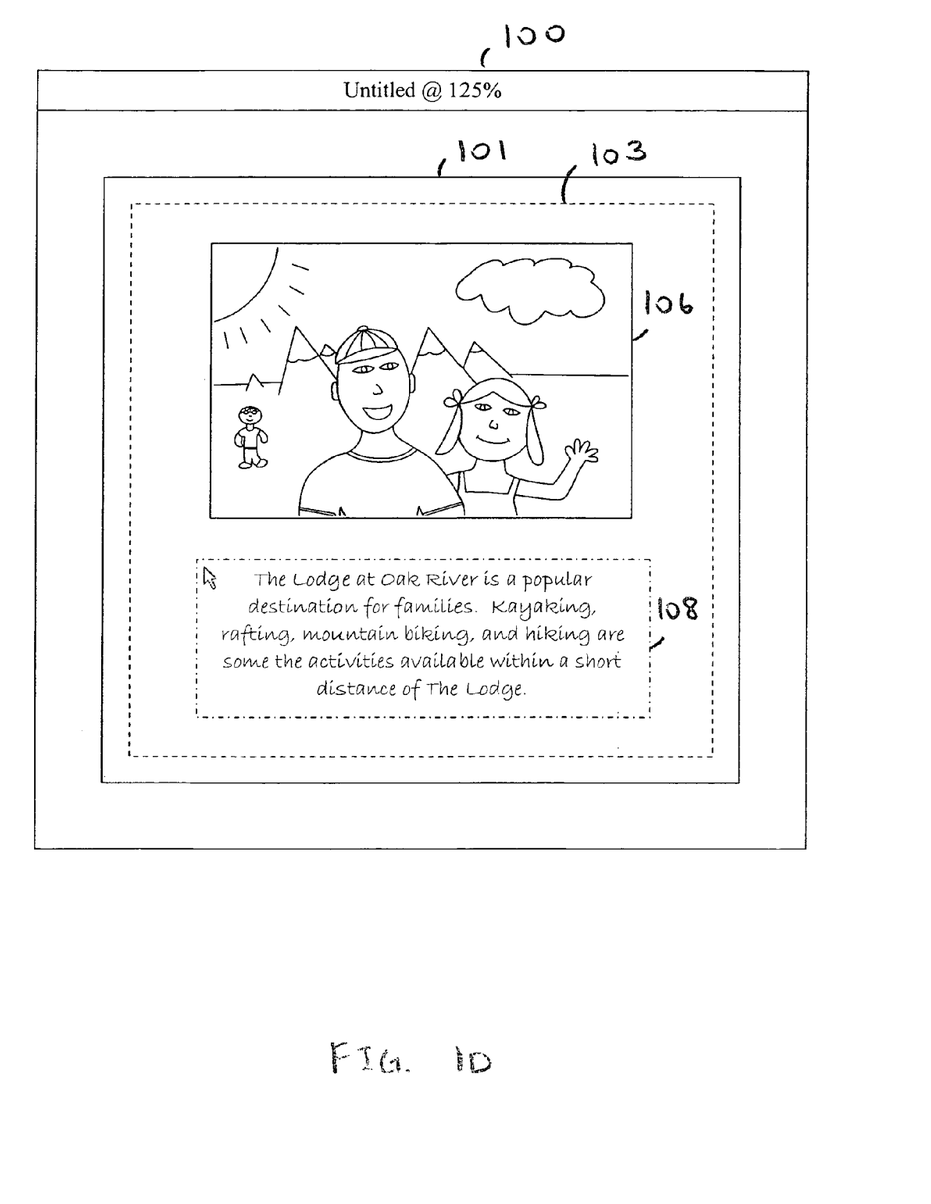
FIG. 1D is a diagram illustrating an embodiment of a document after text has been inserted.

FIG. 1D is a diagram illustrating an embodiment of a document after text has been inserted. In the example shown, placed text 108 has been inserted into page 101. Since there is no other data to be placed, the placement cursor becomes a pointer (not shown) and a thumbnail is no longer displayed. In some cases, there are still some pieces of data to be placed and a new thumbnail is obtained (e.g., a pre-generated thumbnail is retrieved or one is generated when that piece of data is selected for a thumbnail display) and displayed. In some embodiments, the new thumbnail that is displayed is for the piece of data that is now first in a collection of data to be placed.

In some embodiments, an application configured to run on a computer displays thumbnails as described herein. In some embodiments, different techniques or methods are used to deal with different operating systems. For example, some operating systems such as Microsoft Windows are capable of displaying cursors that are generated programmatically at run time. Some operating systems (e.g., Microsoft Windows) have support for relatively large cursors. Some thumbnails are larger than pointers or other art typically displayed as a cursor. In some embodiments, generating a thumbnail includes generating a platform cursor associated with a particular operating system.

In some embodiments, an operating system does not have support for run time cursors and/or large cursors, such as Apple Mac OS. To display thumbnails on devices that use such operating systems, in some embodiments a visible window is created next to a cursor and a thumbnail is drawn in the window. As the cursor moves around, the movement of the window is coupled to that of the cursor so that a user is not able to perceive that there are actually two objects: the window with the thumbnail and the cursor. In some embodiments, an operating system is used to detect when a cursor moves and/or is used to move such a window around. In some embodiments, a placement cursor is drawn into the window, and the cursor is hidden, to ensure that the cursor and thumbnail move as one. In some embodiments, a thumbnail is saved in cache (e.g., so that it does not need to be regenerated). In some embodiments, thumbnails are pre-generated (e.g., once they have been added to a collection of data to be placed) so that they do not have to be generated on the fly once a thumbnail is needed for a particular piece of data in a collection.

In some embodiments, the techniques described herein are used with software applications associated with web pages, word processing documents, presentations/slideshows, still and/or moving images, etc. In some embodiments, thumbnails are displayed using an Internet browser application (e.g., Mozilla Firefox or Microsoft Internet Explorer) rather than an application that is configured to run (e.g., locally) on a computer.

In some embodiments, a thumbnail has a maximum pixel size, such as a maximum height of 96 pixels and a maximum width of 96 pixels. In some embodiments (e.g., where dimensions of a thumbnail are defined in pixels), the size of a thumbnail appears to be the same size even if the user zooms in/out. For example, at the top of document window 100, it is shown that the zoom percentage is 125%. If a user were to zoom in further (e.g., 200%), the size of the thumbnail displayed would still be the same size if the thumbnail has a height/width in pixels. Similarly, even when zooming out, the size of the thumbnail displayed would appear to be the same size in such embodiments. In some applications this is desirable since the thumbnail is shown consistently at a desirable size. For example, even when zooming in very close, a thumbnail will not obscure and/or block page 101. Conversely, when zooming out very far, the thumbnail will not be so small that the user is unable to read the text or recognize the image. Alternatively, in some embodiments, a thumbnail has dimensions that are relative or otherwise fluctuate with zoom as opposed to fixed or absolute dimensions that do not fluctuate. In some embodiments, the user is allowed to choose (e.g., via a preference) if they would like the thumbnails to change size when zooming in or out.

In some embodiments, a thumbnail is at least partially transparent. For example, some operating systems (such as Apple Mac OS) are capable of displaying objects at certain permitted degrees of transparency. In such embodiments, a thumbnail would not completely block or obscure what it is placed over. For example, a user would be able to at least partially see data or objects in a document window underneath a thumbnail. In some scenarios (e.g., where relatively precise placement is desired and/or there are already many objects located in or populating a document), displaying a thumbnail that is at least partially transparent is desirable. In some embodiments, parts of the thumbnail are fully or completely transparent (e.g., the part of a text thumbnail which is not the text itself).

In some embodiments, a user is able to turn off/on display of a thumbnail. In some embodiments, an application starts in a default state or mode with respect to displaying a thumbnail. For example, some applications are configured to start with a thumbnail mode on. If so desired, a user can turn off display of a thumbnail so that only a placement cursor is shown. In various embodiments, any appropriate command, combination of key strokes, or selection from an application pop-up window or menu can be used to change such a setting or configuration. In some embodiments, an application remembers a user's setting so that the next time the application is started the user's previous settings are used.

In some embodiments, displaying a thumbnail is combined with other techniques associated with placement or insertion of data. In some embodiments, some indication is shown where an object will be inserted with respect to objects that are already included in a document. In some embodiments, a document into which data is inserted has a defined or prescribed formatting associated with it. For example, in some embodiments, a document is a word processing document with lines, line spacing, etc. In some embodiments, a hot point is shown with respect to lines in a document.

In some embodiments, displaying a thumbnail varies from the examples shown. In some embodiments, a thumbnail includes other representations of image or text to be inserted, such as a cropped version of the image or some other portion of text besides a beginning portion. In some embodiments, additional information (e.g., a file name and/or file system path) is included in a thumbnail. In some embodiments, a thumbnail is displayed in place of a placement cursor. In some embodiments, a thumbnail is displayed with a placement cursor but movement of one is not necessarily coupled to the other. For example, in some embodiments, a thumbnail is displayed separately from a placement cursor and does not move with a placement cursor. For example, a thumbnail in some applications or interfaces is displayed in separate dialogue box or pop-up window that is entitled "Next object to be placed" and does not move with a placement cursor.

Data to be inserted or placed can be selected using a variety of techniques. The following figure illustrates one embodiment for selecting data to be placed.

Figure 2:
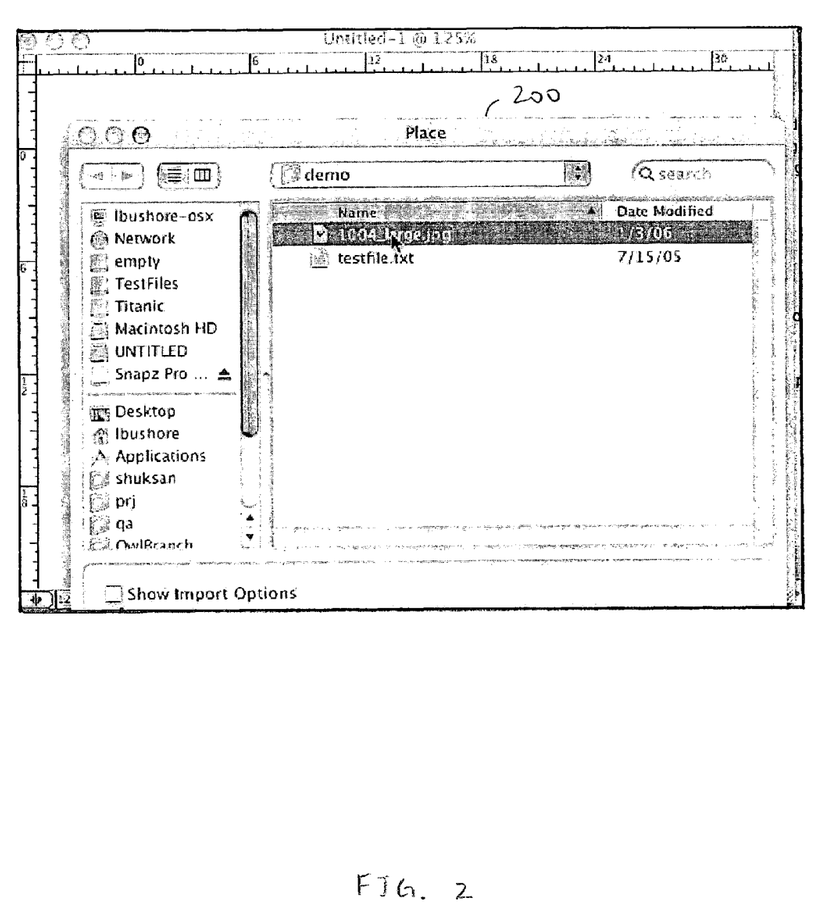
FIG. 2 is a diagram illustrating an embodiment of a placement interface via which data to be inserted is selected.

FIG. 2 is a diagram illustrating an embodiment of a placement interface via which data to be inserted is selected. In the example shown, placement interface 200 is associated with Adobe InDesign. In some embodiments, some other placement tool or interface associated with some other application is used. Placement interface 200 is displayed in response to a user action. For example, using a pull down menu a user may first select "File" and then select "Place" for placement interface 200 to be displayed. Alternatively, in some embodiments a combination of key strokes (e.g., simultaneously pressing the control key and the D key) causes placement interface 200 to be displayed.

Placement interface 200 includes a list of file names. The first file in the list (entitled "1004_large.jpg") is a JPEG file and contains an image. The second file in the list (entitled testfile.txt) contains text. By selecting one or more file names from the list, data associated with the selected files are added to a collection of data to be inserted. In some embodiments, two files are selected and two pieces of data are added simultaneously to the collection of data in a single operation. In some embodiments, after closing placement interface 200, a placement cursor and a thumbnail are displayed for the files that were selected.

In some embodiments, a piece of data for which a thumbnail is displayed is selected using some other technique besides placement interface 200. In some embodiments, a thumbnail is displayed for data selected using cut/copy techniques (e.g., associated with a clipboard). In some embodiments, a thumbnail is displayed for data selected using drag and drop techniques.

Figure 3:
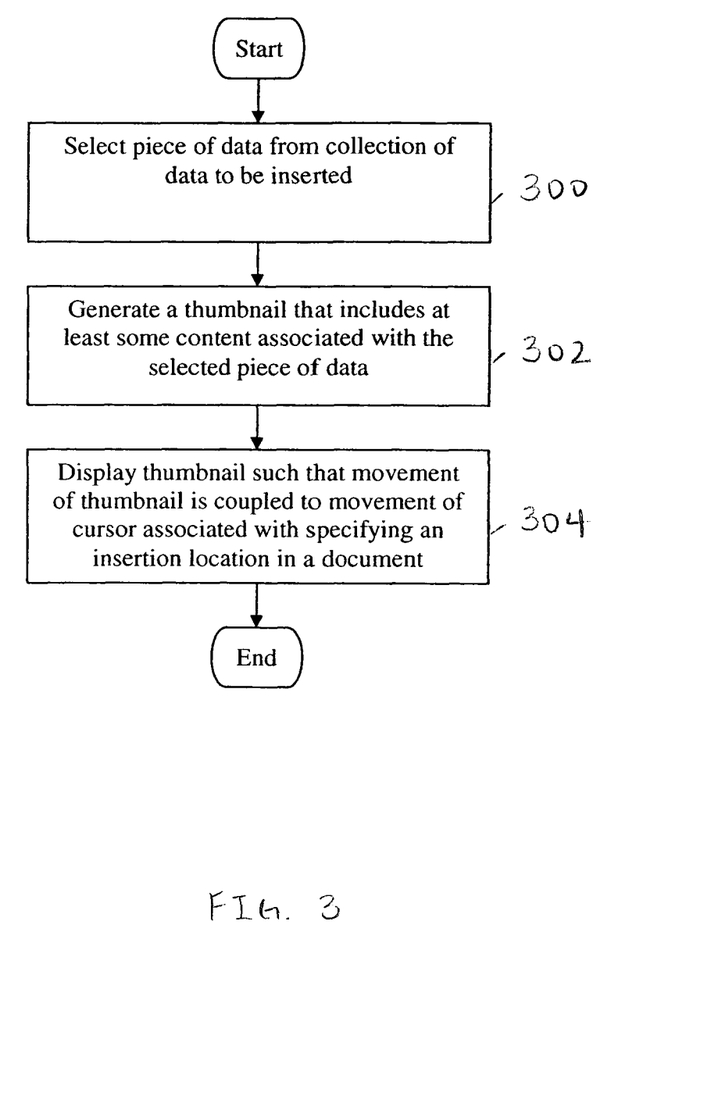
FIG. 3 is a flowchart illustrating an embodiment of a process for generating and displaying a thumbnail.

FIG. 3 is a flowchart illustrating an embodiment of a process for generating and displaying a thumbnail. In the example shown, a collection includes one or more pieces of data to be placed, such as text and/or images. In some cases, a collection is empty, for example, because a user is not in a placement mode, has completed placement of all pieces of data, or has not yet selected data to be placed. In some embodiments, no thumbnail is displayed if a collection of data to be placed is empty.

At 300, a piece of data is selected from a collection of data to be inserted. In some embodiments, the first piece of data (e.g., with respect to a queue or ordering associated with the collection) is the one selected.

A thumbnail is generated that includes at least some content associated with the selected piece of data at 302. For example, in some cases a thumbnail includes or is derived from at least a portion of content associated with the data, such as a clipped and/or down sampled version of an image to be inserted or some portion of text to be inserted. In some embodiments, a thumbnail has a size defined by pixels. In some embodiments, a thumbnail has a maximum height/width. In some embodiments, a thumbnail is partially transparent, for example, so that objects or data underneath a thumbnail are not completely blocked or obscured from a user's view.

At 304, a thumbnail is displayed such that movement of the thumbnail is coupled to movement of a cursor associated with specifying an insertion location in a document. For example, in some embodiments, a cursor and a thumbnail together are a single object and thus move together. In some embodiments, a cursor and a thumbnail are actually two separate objects, but movement of the two is coupled (e.g., separated by a fixed distance with a fixed angular relationship). In some embodiments, additional information or objects are displayed. For example, some interfaces or displays are configured to display the number of pieces of data in a collection if there are two or more pieces of data.

In some cases, the example process is repeated as needed. For example, if the number and/or ordering of a collection of data to be inserted changes, in some embodiments it is decided whether to repeat the example process. In some cases a change to a collection of data may not necessarily trigger the example process to be repeated, for example because it is not necessary to change a thumbnail being displayed.

Figure 4:
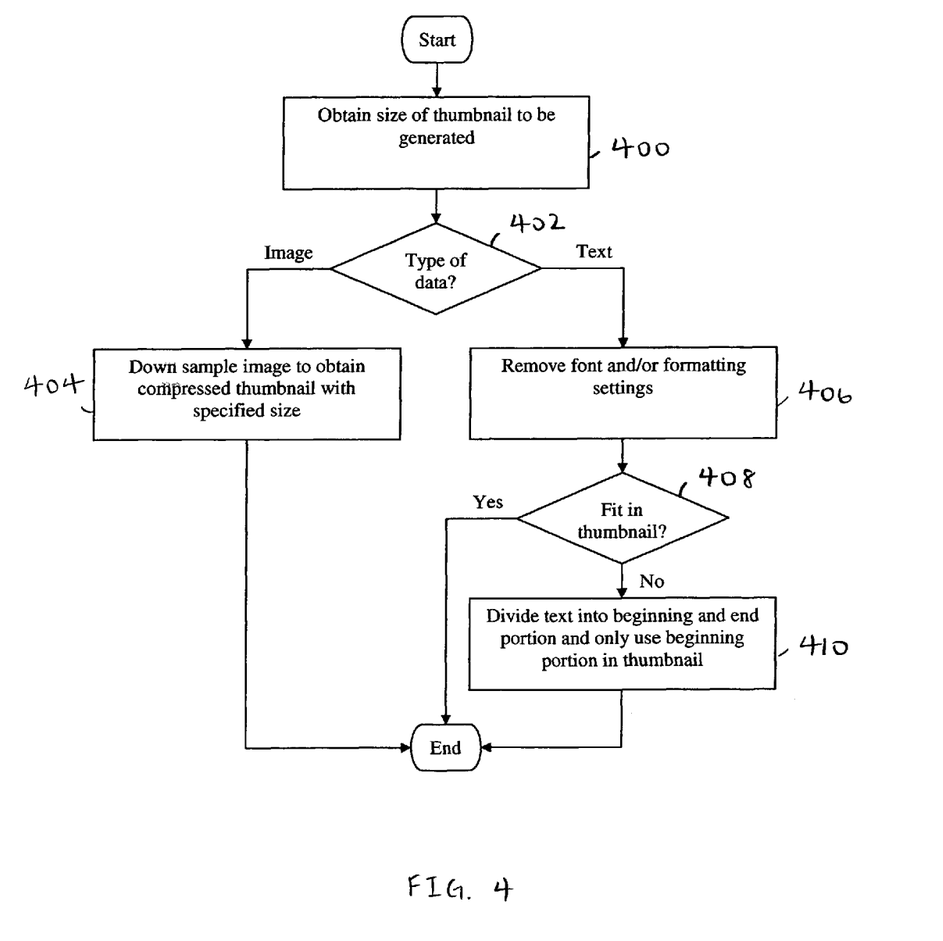
FIG. 4 is a flowchart illustrating an embodiment of a process for generating a thumbnail.

FIG. 4 is a flowchart illustrating an embodiment of a process for generating a thumbnail. In some embodiments, the example process generates a thumbnail for a piece of data that is selected from a collection. In some embodiments, the example process is used at 302 to generate a thumbnail. In some embodiments, thumbnails are generated ahead of time. For example, in some embodiments, thumbnails are generated when or soon after they are selected and added to a collection of data to be inserted. In such embodiments, thumbnails are stored and are retrieved when needed. Alternatively, in some embodiments, the process is performed when a thumbnail is need for a particular piece of data.

At 400, a size of a thumbnail to be generated is obtained. In some embodiments, a thumbnail has a maximum pixel size and in such embodiments maximum dimensions in pixels are obtained. In some embodiments, a thumbnail does not have a size in pixels and expands or shrinks accordingly based on, for example, a zoom percentage. A size obtained at 400 is in any appropriate unit of measurement.

The type of data is determined at 402. In this example, data to be inserted is text, raster image, or vector. In some embodiments, data to be inserted includes some combination of text, raster image, and vector data (i.e., compound data). In such embodiments, the example process is modified accordingly. For example, raster processing, vector processing and text processing are performed.

If data is an image, an image is down sampled to obtain a compressed thumbnail with a specified size at 404. For example, if the thumbnail is 96 pixels by 96 pixels, and the image to be inserted is 288 pixels by 288 pixels, every third pixel in the horizontal direction and every third pixel in the vertical direction is used. In some embodiments, the aspect ratio of an image does not match that of a thumbnail and the image is cropped or stretched to fit the thumbnail. Alternatively, in some embodiments, a thumbnail is expanded or shrunk to fit to the aspect ratio of an image. In some embodiments, blank strips are added to fill in a thumbnail, if, for example, the entire, un-stretched image is desired.

In some cases, an image file contains or is associated with a low resolution preview which is suitable for use as a thumbnail or is suitable to be down sample from to create a thumbnail. In some embodiments, using a pre-generated low resolution preview contained in an image file is more attractive than generating a thumbnail from high or full resolution image data. Images can be of any appropriate type, such as raster/bitmap, vector, or compound (both raster and vector). In some embodiments, vector or compound image data is passed through an extra step (e.g., drawing the data into a bitmap from which is down sampled to obtain a thumbnail).

If data is text, at 406 font and/or formatting settings are removed. For example, the type of font, any underline or bold settings are removed in this example. Formatting settings such as alignment, spacing between lines (e.g., 1.0, 1.5, etc.), and/or justification are also removed.

It is determined at 408 whether text fits in a thumbnail. For example, if the text to be inserted is very long, not all of the text will be able to fit into the thumbnail. In some embodiments, font and/or formatting settings associated with a thumbnail are used in a determination. For example, if a particular font size and/or spacing between lines are used, this information is used in the determination at 408.

If the text fits, the process ends. For example, the entire piece of text is included in a thumbnail after removing formatting and/or font settings. Otherwise, if it does not fit, at 410 text is divided into a beginning and an end portion and only the beginning portion is used in the thumbnail. In some embodiments, the first N words in text are included in a thumbnail (e.g., regardless of the piece of text). In some embodiments, beginning with the first word, words are added to a thumbnail until the thumbnail is full. In some embodiments, once the text for the thumbnail has been decided, it is then drawn into a bitmap.

In some embodiments, a collection of data to be placed contains two or more pieces of data. The following figures show some embodiments in such cases.

Figure 5:
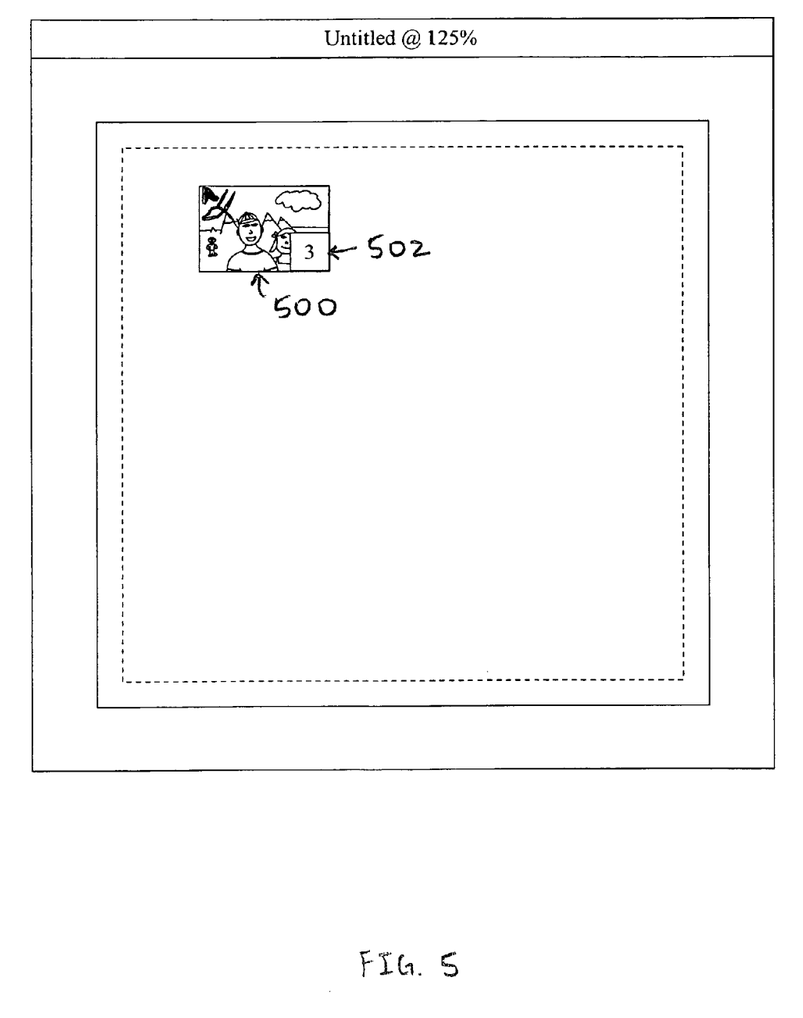
FIG. 5 is a diagram illustrating an embodiment of a thumbnail displayed when a collection of data includes two or more pieces of data.

FIG. 5 is a diagram illustrating an embodiment of a thumbnail displayed when a collection of data includes two or more pieces of data. In the example shown, the collection of data currently has three pieces of data that are to be placed by a user. In the lower right corner of the thumbnail, count 502 shows the number of pieces of data in the collection (i.e., three). Thumbnail 500 includes content from one of the pieces of data in the collection. In this example, thumbnail 500 shows content for the next piece of data that will be placed (i.e., the first piece of data in a queue or order associated with placement). For example, if a user were to click a mouse button or perform some other action that causes placement or insertion to occur, an image of two people on vacation would be inserted.

Thumbnail 500 and count 502 are updated as appropriate. For example, after inserting the image of the two people on vacation, in some embodiments a new thumbnail is generated and a new count (i.e., two) is displayed with the new thumbnail. In some embodiments, if a collection has only one piece of data to be placed, count 502 is not displayed. That is, in some embodiments, count 502 is only displayed if the number of pieces of data in a collection is two or more.

In some applications, displaying count 502 with a thumbnail is convenient for a user. For example, if the user has forgotten how many pieces of data she selected to be placed, count 502 would remind her. In some embodiments, a user is able to turn off/on display of a count with a thumbnail.

Figure 6:
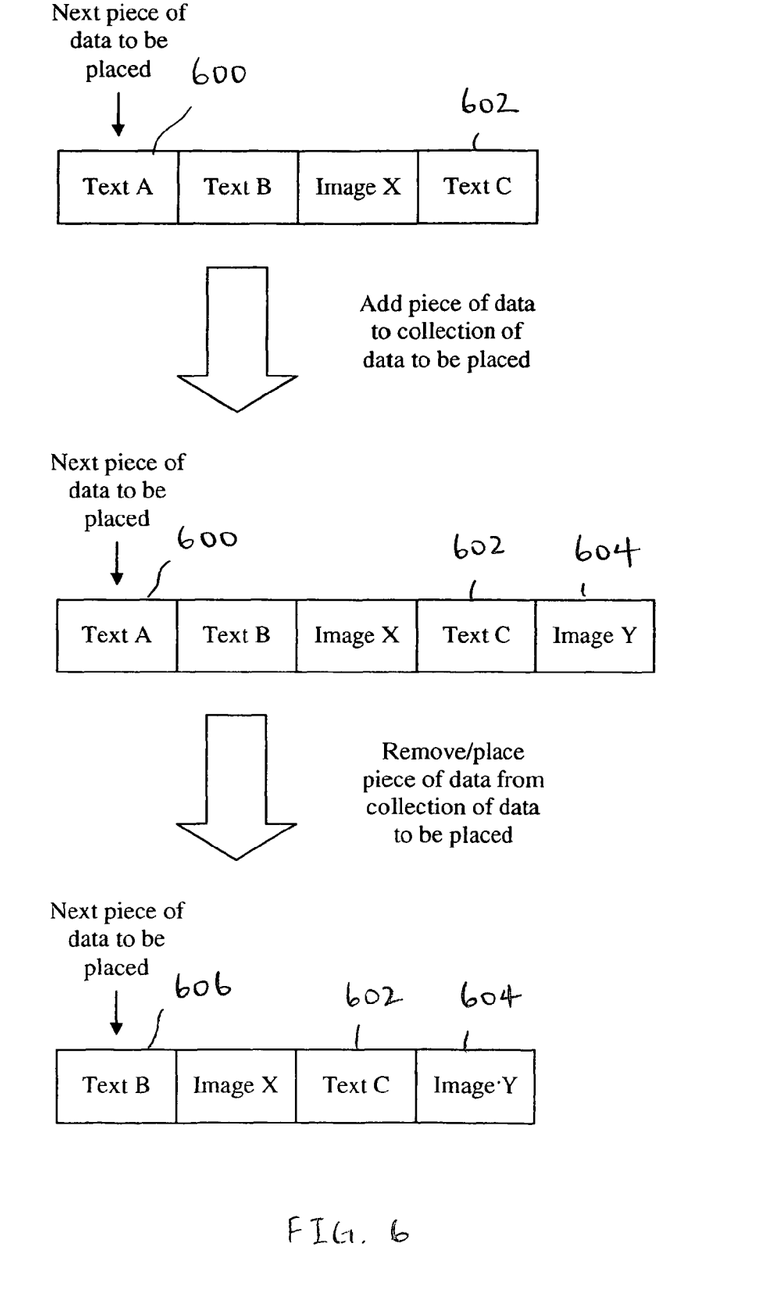
FIG. 6 is a diagram illustrating an embodiment of adding and removing pieces of data from a collection of data to be inserted.

FIG. 6 is a diagram illustrating an embodiment of adding and removing pieces of data from a collection of data to be inserted. In the example shown, a collection of data includes text and images that are to be placed (e.g., in a document) by a user. Text and images are shown in their order within a collection of data to be placed. For example, in the top row, text A 600 is the next piece of data to be placed and text C 602 is the last piece of data to be placed.

A new piece of data is added to the collection and the second row shows the collection after the addition. In some embodiments, a user adds a piece of data to a collection by selecting a corresponding file from a placement interface. In this example, new pieces of data are added to the end of a collection. Thus, image Y 604 is the last piece of data that will be placed and text 602 is now the second to the last piece that will be placed.

The user then decides to remove or place a piece of data from the collection and the third row shows the collection after it occurs. In some cases, a piece of data is inserted or placed (e.g., into a document) and is thus taken out of the collection. In some cases, a user decides that she doesn't want to insert a particular piece of data and removes it without placing it. For example, an appropriate cancel or remove command may be performed. In this example, data that is removed from a collection is removed from the beginning of the collection. Text A 600 at the beginning is removed and text B 606 is now first in the order.

In some embodiments, multiple pieces of data can be added, placed, or removed (substantially) simultaneously. Some applications or interfaces permit a user to configure or control this as desired. For example, a user may control this on the fly by entering number of pieces and then entering a command to add, place, or remove a piece of data.

As the number and/or ordering of a collection changes, thumbnail(s) are updated as appropriate. In some embodiments, a thumbnail is generated for only one piece of data in a collection. In some embodiments, the piece of data for which a thumbnail is generated is the first piece of data in the collection. For example, in the first two rows, a thumbnail of text A 600 is displayed and in the last row a thumbnail of text B 606 is displayed. In some embodiments, multiple thumbnails are displayed. In some embodiments, a count or number of items in a collection is displayed with a thumbnail. For example, counts of four, five, and four are displayed respectively in this example.

In some embodiments, a user is able to perform certain actions (if desired) between placing, adding, or removing pieces of data to/from a collection. For example, in some embodiments, a user is able to adjust the color of an image inserted into a document or is able to change formatting or font related settings of text that is inserted into a document. In some embodiments, a user is able to adjust the placement or location of a piece of data inserted into a document. For example, a user may insert a piece of data into the general area where she wants it placed and may perform fine or precise adjustment using arrow keys. In some embodiments, so long as a user stays in a placement mode, the collection of data to be placed is maintained and is not deleted. In some embodiments, if a user selects certain tools, interfaces, or windows, a collection of data to be placed is deleted. In some embodiments, a user is informed that a particular action will cause one or more pieces of data in a collection to be deleted or removed (e.g., without being placed) and is asked if she would still like to perform that action.

In some embodiments, a user is able to scroll or cycle through a collection of data to rearrange the ordering (e.g., place text C 602 before text B 606). For example, up/down arrow keys or other inputs may be used to scroll through or change the ordering of a collection.

In this example, data is added to a collection and placed in a First In, First Out (FIFO) manner. In some embodiments, some other technique (e.g., Last In, First Out (LIFO)) is used when adding pieces of data to a collection and/or placing data.

Figure 7:
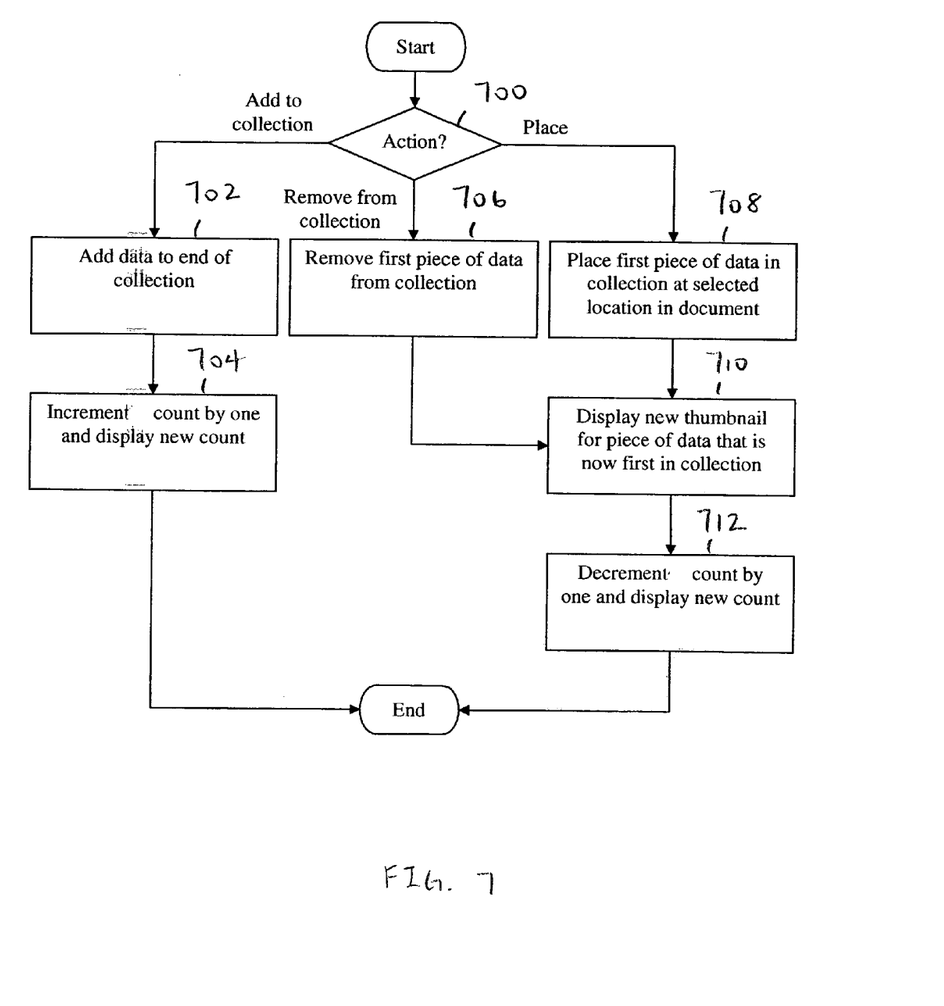
FIG. 7 is a flowchart illustrating an embodiment of a process for handling changes to a collection of data to be placed.

FIG. 7 is a flowchart illustrating an embodiment of a process for handling changes to a collection of data to be placed. In the example shown, the number of pieces of data in a collection changes because data is added, removed or placed. In some embodiments, a user is permitted to add, remove, or place multiple pieces of data from a collection of data using a single command or action. In such embodiments, the example process is modified accordingly to be able to handle the addition, removal, or placement of two or more pieces of data.

At 700 an action is determined. If a piece of data is added to a collection, at 702 data is added to the end of a collection. For example, there may be a queue associated with the order in which pieces of data will be placed. At 704, a count is incremented by one and the new count is displayed. In some embodiments, data is added to an empty collection, and the count is not displayed when it is less than or equal to one.

Otherwise, if a piece of a data is removed from a collection, the first piece of data is removed from a collection at 706. For example, a user may change her mind and decide she doesn't want to place a piece of data after all and may remove it from the collection without inserting it. At 710, a new thumbnail is displayed for the piece of data that is now first in the collection. In some embodiments, a thumbnail is generated by down sampling an image if the data is an image or by including the beginning portion of text if the data is text. In some embodiments, the collection becomes empty and no thumbnail is displayed. At 712, a count is decremented by one and a new count is displayed. In some embodiments, if the count is equal to zero or one the count is not displayed.

Otherwise, if a piece of data is placed, at 708 a first piece of data in a collection is placed at a selected location in a document. A new thumbnail is displayed for the piece of data that is now first in a collection at 710 and a count is decremented and displayed at 712.

The following figures illustrate some embodiments for changing an ordering or queue associated with a collection of data to be placed.

Figure 8:
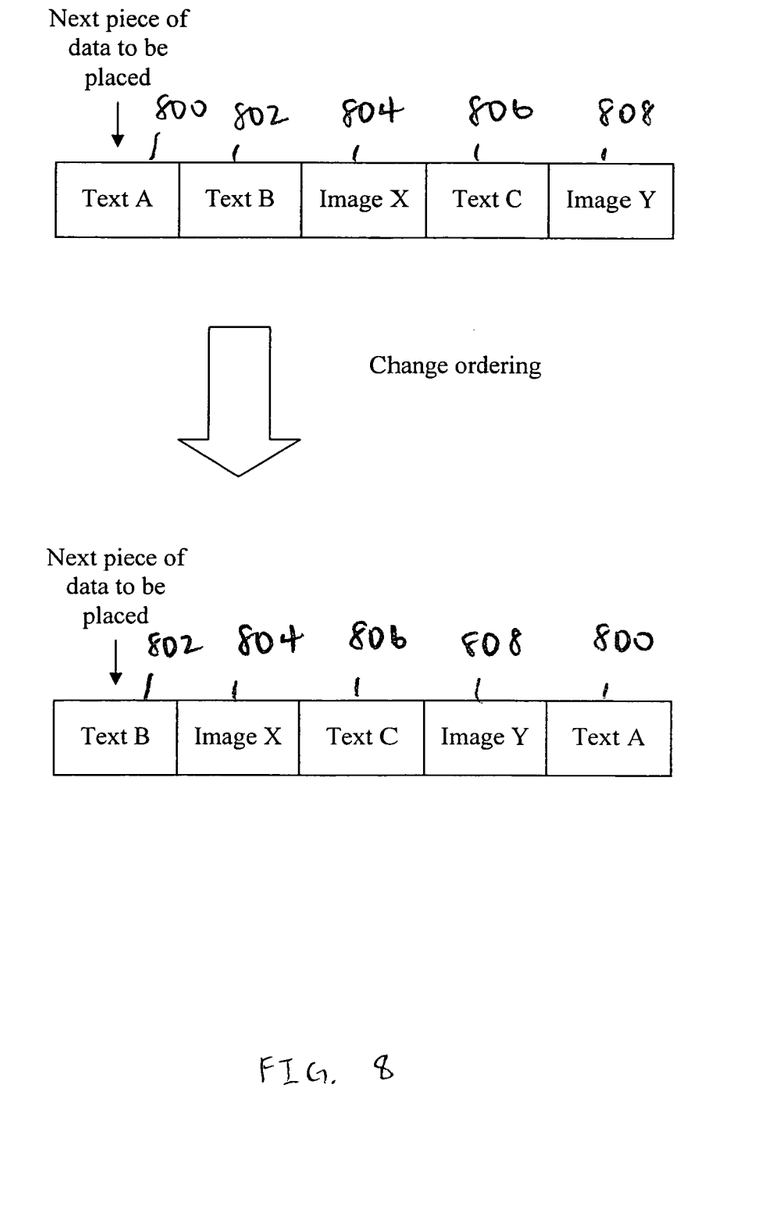
FIG. 8 is a diagram illustrating an embodiment of a collection of data that is reordered by a user.

FIG. 8 is a diagram illustrating an embodiment of a collection of data that is reordered by a user. In the example shown, pieces of data in a collection are shown in an order or queue associated with placement. For example, in the first row, text A 800 is first in the collection and is the next piece of data to be placed. In the example shown, a user is able to move the first piece of data in a collection to the end of the collection. For example, prior to the change in ordering, the order is text A 800, text B 802, image X 804, text C 806, and image Y 808. After the change (shown in the second row), the ordering is text B 802, image X 804, text C 806, image Y 808, and text A 800. The original first piece of data in the collection (i.e., text A 800) is moved to the end of the collection of data.

As the ordering is changed, the thumbnail that is displayed is also updated. For example prior to the change, a thumbnail is displayed for text A 800 since it is first in the collection (see, e.g., the first row). After the change in ordering (see, e.g., the second row), text A 800 is moved to the end of the collection of data and a new thumbnail is generated for text B 802, the piece of data that is now first in the collection. In some embodiments, thumbnails are pre-generated so that thumbnails can more quickly be displayed in the event the ordering and/or count of a collection changes.

In some embodiments, a user has access to a more sophisticated interface and/or has a greater degree of control over a change to an ordering. For example, in some embodiments, thumbnails or other representations are presented to a user for all pieces of data in a collection simultaneously with the placement of the thumbnails reflecting the ordering. For example, thumbnails can be displayed side by side similar to this figure. Other forms of representation (e.g., an ordered list of files names) are used in some embodiments. Using a mouse or other stylus, a user may select a piece of data and drag and drop it into a desired position within the collection. This may allow a user to have no constraints on the ordering of a collection. In some embodiments, thumbnails for all pieces of data are only displayed in a reordering mode or window. For example, in some embodiments a thumbnail is only displayed for the first piece of data in a collection but when a user switches to a reordering window or mode, thumbnails are displayed for all pieces of data in a collection.

Figure 9:
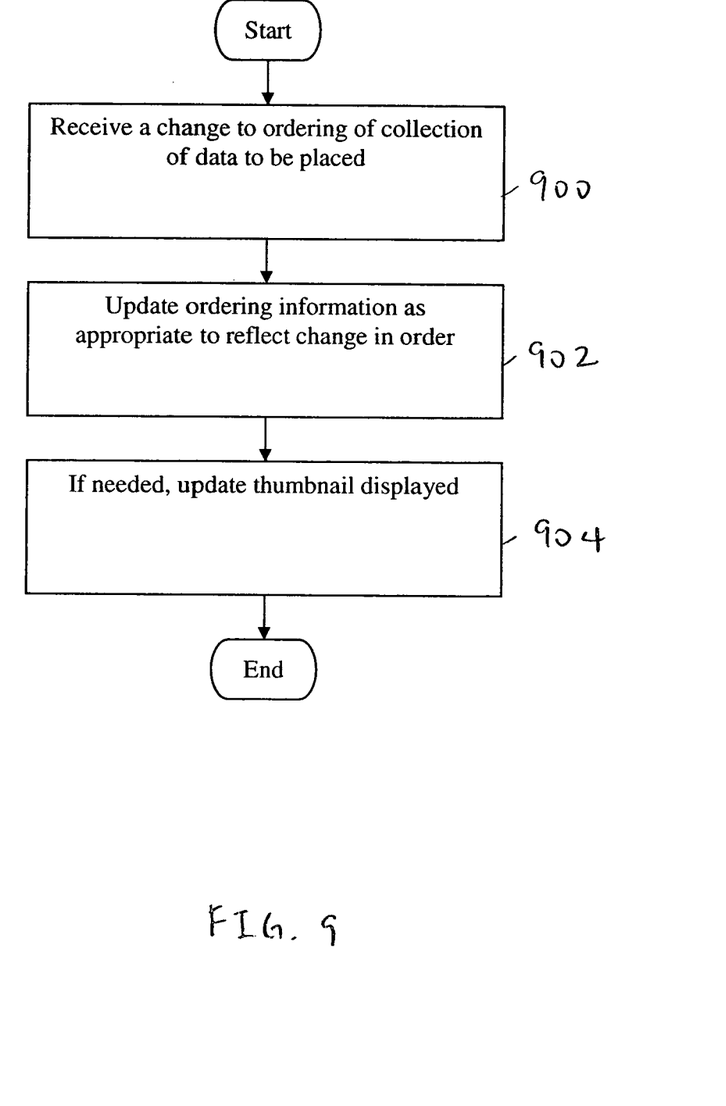
FIG. 9 is a flowchart illustrating an embodiment of a process for updating a thumbnail in response to a change in the order of a collection of data to be inserted.

FIG. 9 is a flowchart illustrating an embodiment of a process for updating a thumbnail in response to a change in the order of a collection of data to be inserted. For example, in some cases, the first piece of data in the collection is sent to the end of the collection. In some cases, some other change to an ordering is made by a user.

At 900, a change to an ordering of a collection of data to be placed is received. In some embodiments, a user presses a prescribed combination of keys to move the first piece of data in a collection to the end. In some embodiments, a graphical interface associated with changing the ordering of a collection of information is brought up and the user changes the ordering via the interface. For example, a user may use drag and drop techniques to reorder a collection of data.

At 902, ordering information is updated as appropriate to reflect change in order. For example, in some embodiments, order is tracked and/or managed using a sorted list and the sorted list is rearranged. In some embodiments, links, pointers, or other references are used and these references are modified appropriately. In some embodiments, each piece of data has associated with it a number that reflects its place within an ordering or queue. In such embodiments, one or more such numbers are adjusted to reflect the new ordering.

If needed, a thumbnail displayed is updated at 904. In some embodiments, it is determined whether the first piece of data in a collection has changed. In some embodiments, a thumbnail is generated for multiple pieces of data and appropriate decision making is performed to determine whether to change one or more of the thumbnails displayed. Some changes may not necessarily cause a new thumbnail to be displayed. In some embodiments, a thumbnail is pre-generated and in the event a new thumbnail is displayed the pre-generated thumbnail is displayed, for example using a cursor manager associated with an operating system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   selecting a piece of data from a collection of one or more pieces of data to be inserted in a document;
   generating a thumbnail that includes at least some content associated with the selected piece of data, wherein the thumbnail is independent of the document;
   displaying the thumbnail in a display in place of or with a cursor, wherein the cursor is associated with specifying an insertion location in the document;
   detecting a modification to a document zoom percentage for the document;
   identifying that a thumbnail zoom setting for the thumbnail specifies that a thumbnail zoom percentage for the thumbnail is to remain constant, wherein the thumbnail zoom setting is independent of the document zoom percentage;
   based on the thumbnail zoom setting, maintaining the thumbnail zoom percentage;
   modifying the thumbnail zoom setting to specify that the thumbnail zoom percentage is to change in response to an additional modification to the document zoom percentage;
   detecting the additional modification to the document zoom percentage; and
   based on the thumbnail zoom setting as modified, modifying the thumbnail zoom percentage.

2. A method as recited in claim 1, wherein movement of the thumbnail is coupled to movement of the cursor.

3. A method as recited in claim 1 further comprising receiving an indication of a plurality of new pieces of data to be added to the collection and adding the plurality of new pieces of data to the collection.

4. A method as recited in claim 1 further comprising receiving an indication of a plurality of pieces of data selected from the collection to be placed and substantially simultaneously placing the plurality of pieces of data in the document.

5. A method as recited in claim 1, wherein the selected piece of data includes at least one of text, vector data, or raster image.

6. A method as recited in claim 1, wherein generating the thumbnail for a given piece of data is performed prior to selecting that piece of data.

7. A method as recited in claim 1, wherein the thumbnail as generated has a maximum height and/or maximum width in pixels.

8. A method as recited in claim 1 further comprising no longer displaying the thumbnail based on an event where the collection is empty.

9. A method as recited in claim 1, wherein the thumbnail is generated for only one piece of data in the collection based on an event wherein there are two or more pieces of data in the collection.

10. A method as recited in claim 1, wherein:
    the thumbnail is generated for only one piece of data in the collection based on an event wherein there are two or more pieces of data in the collection; and
    the method further comprises determining whether to change said only one piece of data for which the thumbnail is generated based on an event there is a change to a number of pieces of data in the collection and/or an ordering of the collection.

11. A system comprising:
    a processor; and
    a memory coupled with the processor, wherein the memory is configured to provide the processor with instructions which when executed cause the processor to:
    select a piece of data from a collection of one or more pieces of data to be inserted in a document;
    generate a thumbnail that includes at least some content associated with the selected piece of data;

detecting a modification to a document zoom percentage for the document;

identifying that a thumbnail zoom setting for the thumbnail specifies that a thumbnail zoom percentage for the thumbnail is to remain constant, wherein the thumbnail zoom setting is independent of the document zoom percentage;

based on the thumbnail zoom setting, maintaining the thumbnail zoom percentage;

modifying the thumbnail zoom setting to specify that the thumbnail zoom percentage is to change in response to an additional modification to the document zoom percentage;

detecting the additional modification to the document zoom percentage; and based on the thumbnail zoom setting as modified, modifying the thumbnail zoom percentage.

12. A system as recited in claim 11, wherein the selected piece of data also includes a raster image and the instructions for generating the thumbnail include instructions for down sampling the raster image.

13. A system as recited in claim 11, wherein the selected piece of data also includes vector data and the instructions for generating the thumbnail include instructions for generating a bitmap from the vector data.

14. A system as recited in claim 11, wherein the selected piece of data includes text and the instructions for generating the thumbnail include instructions for (1) dividing the text into a beginning portion and an end portion, (2) including the beginning portion of the text in the thumbnail, and (3) generating a bitmap.

15. A system as recited in claim 11, wherein the memory is configured to provide the processor with further instructions for displaying a number of pieces of data in the collection based on an event wherein there are two or more pieces of data in the collection.

16. A system as recited in claim 11, wherein the memory is configured to provide the processor with further instructions for receiving a new piece of data to be added to the collection and adding the new piece of data to the end of an ordering of the collection.

17. A system as recited in claim 11, wherein the thumbnail is generated for only one piece of data based on an event wherein there are two or more pieces of data in the collection, and said only one piece of data for which the thumbnail is generated is first in an ordering of the collection.

18. A computer program product embodied in a non-transitory computer storage medium and comprising computer instructions for:

selecting a piece of data from a collection of one or more pieces of data to be inserted in a document;

generating a thumbnail that includes at least some content associated with only the selected piece of data, wherein the thumbnail is independent of the collection of one or more pieces of data;

displaying the thumbnail in a display in place of or with a cursor, wherein the cursor is associated with specifying an insertion location in the document;

detecting a modification to a document zoom percentage for the document;

identifying that a thumbnail zoom setting for the thumbnail specifies that a thumbnail zoom percentage for the thumbnail is to remain constant, wherein the thumbnail zoom setting is independent of the document zoom percentage;

based on the thumbnail zoom setting, maintaining the thumbnail zoom percentage;

modifying the thumbnail zoom setting to specify that the thumbnail zoom percentage is to change in response to an additional modification to the document zoom percentage;

detecting the additional modification to the document zoom percentage; and based on the thumbnail zoom setting as modified, modifying the thumbnail zoom percentage.

19. A computer program product as recited in claim 18, wherein the selected piece of data includes a raster image and generating the thumbnail includes down sampling the raster image.

20. A computer program product as recited in claim 18, wherein the selected piece of data includes vector data and generating the thumbnail includes creating a bitmap from the vector data.

21. A computer program product as recited in claim 18, wherein the selected piece of data includes text and generating the thumbnail includes (1) dividing the text into a beginning portion and an end portion, (2) including the beginning portion of the text in the thumbnail, and (3) generating a bitmap.

22. A computer program product as recited in claim 18, the computer program product further comprising computer instructions for displaying a number of pieces of data in the collection based on an event wherein there are two or more pieces of data in the collection.

23. A computer program product as recited in claim 18, the computer program product further comprising computer instructions for receiving a new piece of data to be added to the collection and adding the new piece of data to the end of an ordering of the collection.

24. A computer program product as recited in claim 18, wherein the thumbnail is generated for only one piece of data in the collection based on an event wherein there are two or more pieces of data in the collection, and said only one piece of data for which the thumbnail is generated is first in an ordering of the collection.

25. The method of claim 1, further comprising:

determining that the selected piece of data comprises formatted text; and generating the thumbnail to contain at least some portion of the formatted text by removing an existing format or style other than font size from the formatted text, wherein the existing format or style includes at least one of a font type, a font effect applied to the formatted text, or a spacing of the formatted text, and applying a different format or style to the formatted text for display in the thumbnail.

26. The method of claim 1, wherein the thumbnail is independent of the collection of one or more pieces of data and includes at least some content associated with only the selected piece of data, further comprising:

detecting a modification to a number of pieces or an addition of pieces in the collection;

removing the thumbnail; and generating a different thumbnail that includes at least some content associated with a different piece of data based on the modification to the number of pieces or an order of pieces in the collection.

* * * * *